(12) United States Patent
Yamada et al.

(10) Patent No.: US 8,825,347 B2
(45) Date of Patent: Sep. 2, 2014

(54) ENGINE AUTO-STOP VEHICLE AND CONTROL METHOD THEREFOR

(75) Inventors: Naohiro Yamada, Atsugi (JP); Keichi Tatewaki, Atsugi (JP); Shinichiro Watanabe, Yokohama (JP); Noritaka Aoyama, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 354 days.

(21) Appl. No.: 13/217,004

(22) Filed: Aug. 24, 2011

(65) Prior Publication Data

US 2012/0059571 A1   Mar. 8, 2012

(30) Foreign Application Priority Data

Sep. 3, 2010   (JP) ................. 2010-197722

(51) Int. Cl.
| | | |
|---|---|---|
| *F02D 45/00* | (2006.01) | |
| *F02D 29/04* | (2006.01) | |
| *B60W 10/30* | (2006.01) | |
| *F16H 61/00* | (2006.01) | |
| *F16H 61/662* | (2006.01) | |
| *F16H 37/02* | (2006.01) | |
| *F16H 59/48* | (2006.01) | |
| *F16H 61/70* | (2006.01) | |

(52) U.S. Cl.
CPC ...... *F16H 61/0031* (2013.01); *F16H 61/66272* (2013.01); *F16H 37/022* (2013.01); *F16H 2312/14* (2013.01); *Y02T 10/76* (2013.01); *F16H 59/48* (2013.01); *F16H 61/70* (2013.01); *F16H 2037/023* (2013.01)
USPC ....................................... 701/112

(58) Field of Classification Search
USPC ............... 701/22, 51, 54, 58–60, 66–68, 112; 180/65.21, 65.27, 65.275, 65.285; 192/3.51, 3.63, 113.3–113.36, 70; 477/0.2, 3, 5, 6, 7, 8, 15, 44.2, 115, 477/156, 158, 906.907, 2
See application file for complete search history.

(56) References Cited

U.S. PATENT DOCUMENTS

| | | | |
|---|---|---|---|
| 6,390,947 B1 * | 5/2002 | Aoki et al. ...................... 477/3 |
| 6,556,910 B2 * | 4/2003 | Suzuki et al. .................. 701/54 |
| 6,692,402 B2 * | 2/2004 | Nakamori et al. ............... 477/3 |
| 6,913,558 B2 * | 7/2005 | Mori et al. ...................... 477/3 |
| 7,011,603 B2 * | 3/2006 | Kobayashi et al. ............ 477/62 |
| 7,137,924 B2 * | 11/2006 | Ito et al. .......................... 477/3 |
| 7,748,353 B2 * | 7/2010 | Russell et al. ............. 123/90.12 |
| 7,846,060 B2 * | 12/2010 | Kanayama et al. ............... 477/3 |
| 7,951,043 B2 * | 5/2011 | Reisch et al. ................ 477/156 |
| 8,403,646 B2 * | 3/2013 | Yoshinami .................... 417/2 |
| 8,475,137 B2 * | 7/2013 | Kobayashi et al. ........ 417/44.11 |
| 8,498,790 B2 * | 7/2013 | Fujiwara et al. ................ 701/59 |

(Continued)

FOREIGN PATENT DOCUMENTS

| | | |
|---|---|---|
| JP | 2001-041067 A | 2/2001 |
| JP | 2004-340206 A | 12/2004 |

(Continued)

*Primary Examiner* — Hieu T Vo
*Assistant Examiner* — Arnold Castro
(74) *Attorney, Agent, or Firm* — Foley & Lardner LLP

(57) ABSTRACT

A controller actuates an electrical oil pump when an idle stop condition or a coast stop condition holds and causes the actuation of the electrical oil pump to continue without being stopped until an accelerated state of a vehicle or a driver's intention to accelerate is determined even if the idle stop condition and the coast stop condition no longer holds thereafter.

18 Claims, 9 Drawing Sheets

(56) References Cited

U.S. PATENT DOCUMENTS

| | | | |
|---|---|---|---|
| 2003/0045988 A1* | 3/2003 | Suzuki et al. | 701/54 |
| 2003/0109970 A1 | 6/2003 | Nakamori et al. | |
| 2010/0228451 A1* | 9/2010 | Hosoya et al. | 701/51 |
| 2011/0077828 A1* | 3/2011 | Matsuda et al. | 701/54 |
| 2012/0035817 A1* | 2/2012 | Waku et al. | 701/54 |
| 2013/0151129 A1* | 6/2013 | Tatewaki et al. | 701/112 |

FOREIGN PATENT DOCUMENTS

| | | |
|---|---|---|
| JP | 2007-232115 A | 9/2007 |
| JP | 2007-247910 A | 9/2007 |
| JP | 2008-254725 A | 10/2008 |

* cited by examiner

… (1) …

ENGINE AUTO-STOP VEHICLE AND CONTROL METHOD THEREFOR

FIELD OF THE INVENTION

The present invention relates to an engine auto-stop vehicle in which an engine is automatically stopped and restarted.

BACKGROUND OF THE INVENTION

An engine stop control is known which automatically temporarily stops an engine when a predetermined engine stop condition holds and automatically restarts the engine when a restart condition holds. For example, an idle stop control and a coast stop control are known as the engine stop control.

The idle stop control stops an engine when a vehicle stops and an idle stop condition holds and restarts the engine when a brake is off and the idle stop condition no longer holds.

The coast stop control stops an engine when an accelerator is off and a brake is on to set a coast state and a vehicle speed is equal to or below a predetermined vehicle speed while a vehicle is running, and restarts the engine when the accelerator is on or the brake is off and the coast stop condition no longer holds.

When the engine is stopped by the above engine stop control, a mechanical oil pump driven by the engine also simultaneously stops. Accordingly, it is disclosed in JP2007-247910A that an electrical oil pump which is operated by power stored in a battery is provided separately from a mechanical oil pump and a working pressure of a transmission is ensured by driving the electrical oil pump during an engine stop control.

SUMMARY OF THE INVENTION

Here, when the electrical oil pump is switched from an OFF state to an ON state, a motor driver which controls a motor for driving and rotating the pump generates heat. Accordingly, to prevent the overheating of the motor driver, the electrical oil pump is so controlled that the restart thereof is prohibited for a predetermined time after the stop.

However, the restart of the electrical oil pump is still prohibited in such a state where the engine stop condition immediately holds again after the engine stop condition no longer holds during the engine stop control and the engine restarts and the electrical oil pump stops. Thus, the actuation of the mechanical oil pump needs to be continued to ensure a hydraulic pressure, wherefore the engine cannot be stopped before the elapse of a restart prohibition time.

That is, even in a situation where the engine stop control is possible, the engine stop control cannot be executed until the restart prohibition of the electrical oil pump is lifted. Thus, the start of the engine stop control is delayed and a time during which the engine is stopped is shortened by that much, wherefore a fuel economy improvement effect by the engine stop control is reduced.

The present invention aims to promote a fuel economy improvement effect by an engine stop control.

An engine auto-stop vehicle according to an aspect of this invention includes an engine which automatically stops when a stop condition holds and restarts when a restart condition holds, a first oil pump which is driven by the engine, a second oil pump which operates during the automatic stop of the engine, an acceleration determining unit that performs one or more of acceleration condition determinations as to whether or not the vehicle is in an accelerating state, whether or not there is an acceleration request and whether or not an acceleration request is predicted, and an oil pump control unit that actuates the second oil pump when the stop condition holds and causes the actuation of the second oil pump to continue during a period until the determination is performed by the acceleration determining unit after the restart condition holds.

A control method according to another aspect of this invention is a control method for an engine auto-stop vehicle including an engine which automatically stops when a stop condition holds and restarts when a restart condition holds, a first oil pump which is driven by the engine and a second oil pump which operates during the automatic stop of the engine. The control method includes a determining step of performing one or more of acceleration condition determinations as to whether or not the vehicle is in an accelerating state, whether or not there is an acceleration request and whether or not an acceleration request is predicted, and a continuing step of actuating the second oil pump when the stop condition holds and causing the actuation of the second oil pump to continue during a period until the determination is performed in the determining step after the restart condition holds.

According to these aspects, since stopping of the second oil pump can be avoided in a situation where the automatic stop of the engine is temporarily interrupted, the engine can be quickly automatically stopped without being restricted by the second oil pump when the engine stop condition holds again. Therefore, a fuel economy improvement effect by the automatic stop of the engine can be promoted.

DESCRIPTION OF PREFERRED EMBODIMENTS

Hereinafter, embodiments of the present invention are described with reference to the accompanying drawings. In the following description, a "speed ratio" of a certain transmission is a value obtained by dividing an input rotation speed of this transmission by an output rotation speed thereof.

(First Embodiment)

Figure 1:
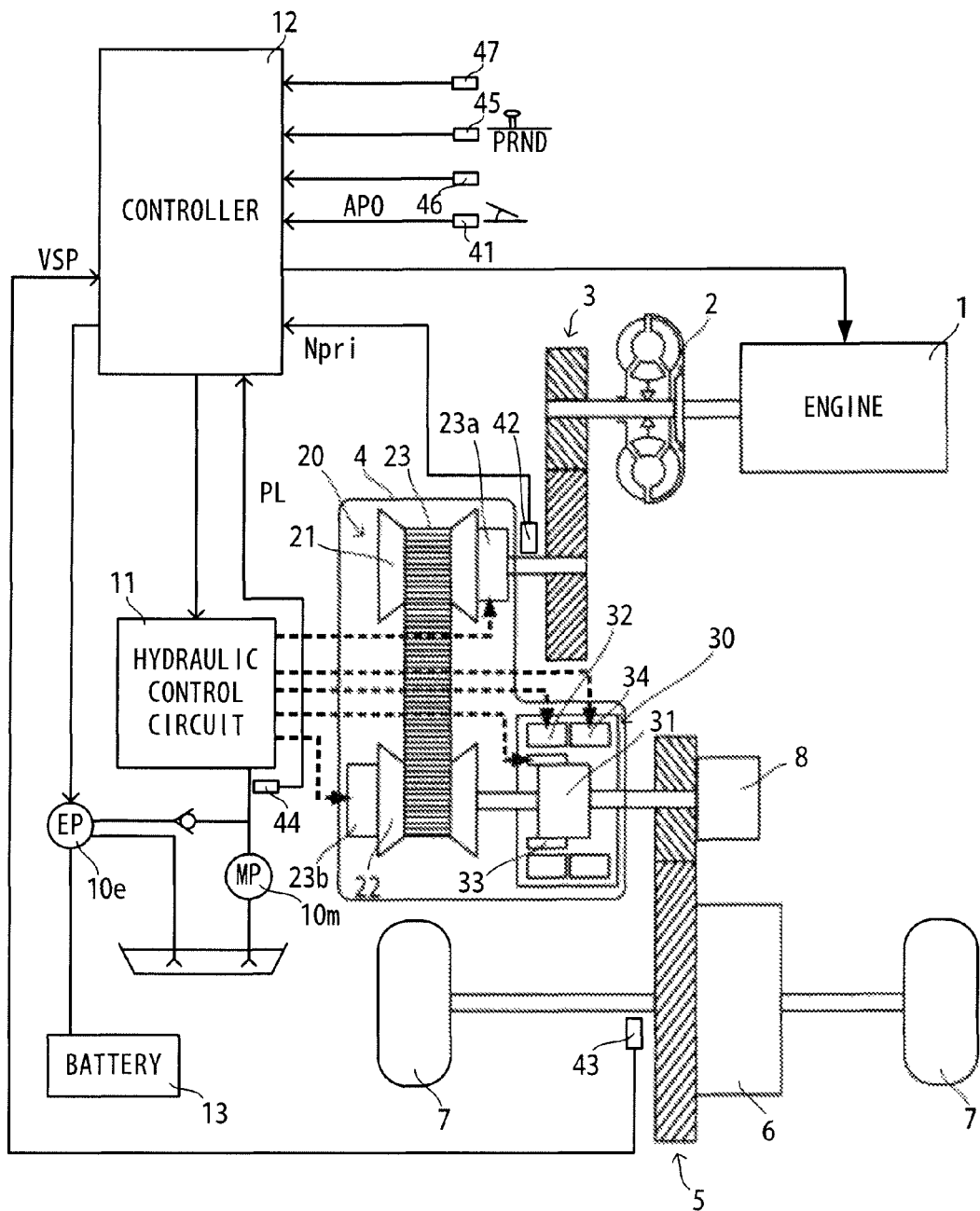
FIG. 1 is a schematic construction diagram of an engine auto-stop vehicle according to a first embodiment.

FIG. 1 is a schematic construction diagram of an engine auto-stop vehicle according to a first embodiment of the present invention. This vehicle includes an engine 1 as a driving source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, an electric motor for driving and rotating the oil pump main body and a motor driver, and can control an operating load to an arbitrary load or in multiple steps. Further, the transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to the respective components of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected before (input shaft side) the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the movable conical plate and the fixed conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
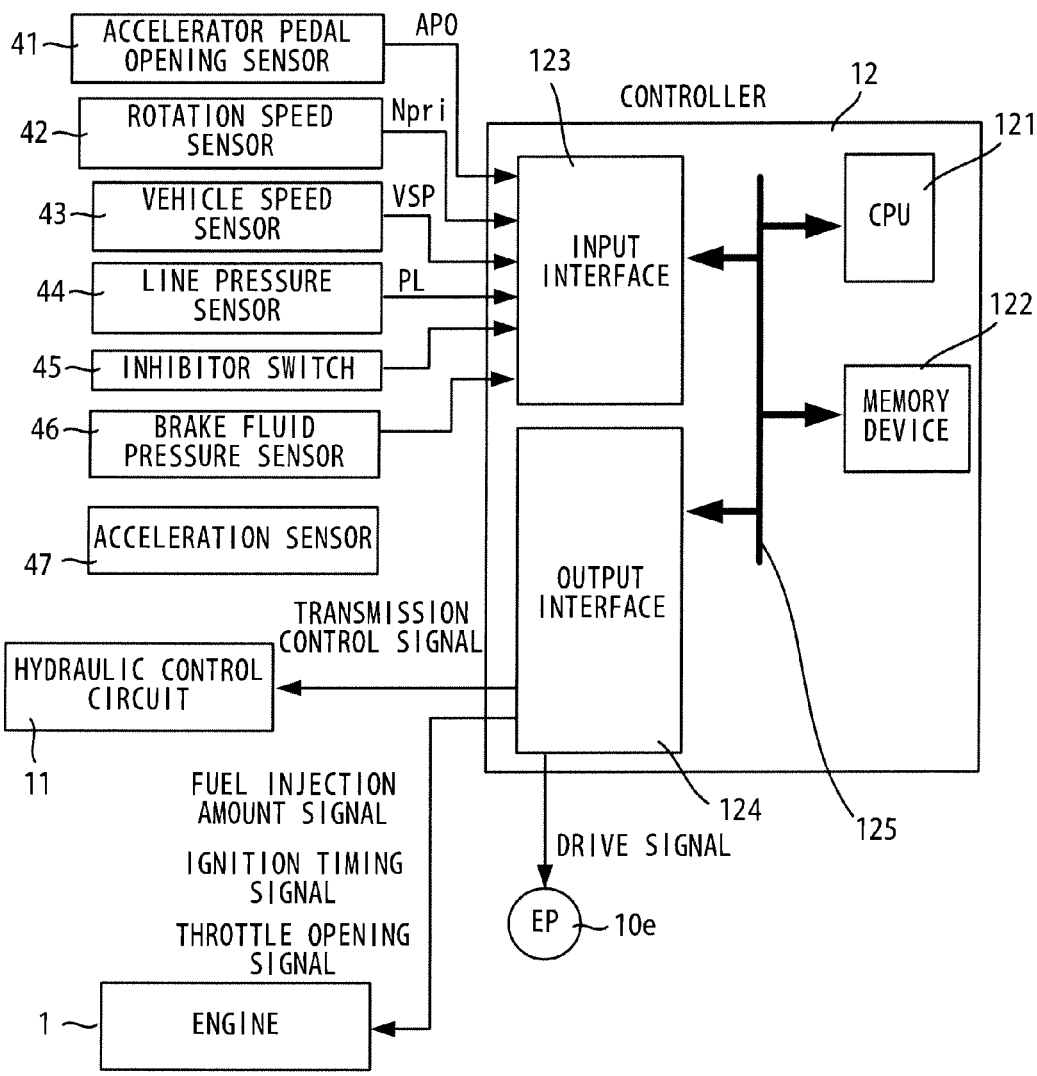
FIG. 2 is a diagram showing the internal construction of a controller.

A controller 12 is for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, an output signal of an acceleration sensor 47 for detecting an acceleration of the vehicle and like output signals.

A control program of the engine 1, a transmission control program of the transmission 4, and various maps and tables used in these programs are stored in the memory device 122. The CPU 121 reads the transmission control program stored in the memory device 122 and implements it, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and the motor driver of the electrical oil pump 10e via the output interface 124. Various values used in the computations by the CPU 121 and the results of these computations are appropriately stored in the memory device 122.

The hydraulic control circuit 11 includes a plurality of flow passages and a plurality of hydraulic control valves. In accordance with the transmission control signal from the controller 12, the hydraulic control circuit 11 controls the plurality of hydraulic control valves to switch supply passages of the hydraulic pressure, prepares a necessary hydraulic pressure from a hydraulic pressure produced by the mechanical oil pump 10m or the electrical oil pump 10e, and supplies this hydraulic pressure to the respective components of the transmission 4. In this way, the speed ratio of the variator 20 and the gear position of the sub-transmission mechanism 30 are changed to shift the transmission 4.

Here, the actuations of the mechanical oil pump 10m and the electrical oil pump 10e are described.

Since the mechanical oil pump 10m is driven utilizing a part of power of the engine 1, the hydraulic pressure cannot be supplied to the hydraulic control circuit 11 while the engine 1 is in a stopped state. Accordingly, to ensure the hydraulic pressure during the stop of the engine, the electrical oil pump 10e is driven while the engine 1 is in the stopped state.

Note that "while the engine 1 is in the stopped state" mentioned here does not include a parked state of the vehicle (key-off state) and means that the vehicle is in an operating state (after the start of the engine and a key-on state) (including a state where the vehicle speed=0) and the engine 1 is in the stopped state. Further, the "stop of the engine 1" does not necessarily require that the rotation of the engine 1 is completely stopped and includes very low speed rotation at which a necessary hydraulic pressure cannot be ensured only by the mechanical oil pump 10m.

That is, the electrical oil pump 10e operates when the engine 1 is stopped by an idle stop control or a coast stop control, i.e. when the engine 1 is in an idle stop state or a coast stop state. The idle stop control and the coast stop control are described below.

The idle stop control is a control for suppressing a fuel consumption amount by automatically stopping the engine 1 (idle stop) during the stop of the vehicle.

Upon performing an idle stop, the controller 12 determines conditions a1 to a6 listed below.

a1: vehicle is in a stopped state (VSP=0)
a2: brake pedal is depressed (brake fluid pressure is equal to or higher than a predetermined value)
a3: accelerator pedal is completely released (accelerator pedal opening APO=0)
a4: water temperature of the engine 1 is in a predetermined range Xe
a5: oil temperature of the transmission 4 is in a predetermined range Xt
a6: inclination of a vehicle body (≈road surface gradient) is equal to or smaller than a predetermined value Then, the controller 12 determines that an idle stop condition holds and permits an idle stop to cancel fuel injection and stop the engine 1 when all of these conditions a1 to a6 hold.

A lower limit value of the predetermined range Xe of the water temperature of the engine 1 is set at a temperature at which warm-up of the engine 1 is judged to be already finished, and an upper limit value thereof is set at the lower limit of a high temperature region where after idle of the engine 1 is necessary.

During the idle stop, a time required up to a state where the frictional engagement element can transmit power is shortened by engaging the frictional engagement element of the transmission 4 or changing a position of a piston toward engage side by the hydraulic pressure produced by the electrical oil pump 10e. Accordingly, the predetermined range Xt of the oil temperature of the transmission 4 is set at a temperature range where the electrical oil pump 10e can normally rotate in view of the viscosity of hydraulic oil.

Further, the controller 12 determines whether or not the above conditions a1 to a6 respectively continue to hold even during the idle stop, and determines that the idle stop condition does not hold and ends the idle stop, i.e. restarts the engine 1 if even one of them no longer holds.

On the other hand, the coast stop control is a control for stopping the engine 1 when the vehicle is in a coast state and, for example, the lock-up clutch is released.

In the coast state, fuel injection is canceled for the purpose of suppressing the fuel consumption amount. Since the engine 1 is rotated as the drive wheels rotate, the mechanical oil pump 10m is driven and a necessary hydraulic pressure can be ensured. However, when the vehicle speed decreases to a certain extent, the lock-up clutch of the torque converter 2 is released, whereby the rotation speed of the engine 1 decreases. Thus, fuel injection is restarted to avoid an engine stall. A control for canceling the fuel injection and stopping the engine 1 in a region where the fuel injection has been originally restarted in this way is the coast stop control.

Since the fuel injection is canceled and the lock-up clutch is released during the coast stop control, the rotation speed of the engine 1 is very low, whereby the rotation of the mechanical oil pump 10m is almost stopped. Accordingly, the electrical oil pump 10e is driven at the time of the coast stop control to ensure a necessary hydraulic pressure.

To determine the coast stop state, the controller 12 determines, for example, conditions b1 to b4 listed below:

b1: vehicle is running (VSP≠0)
b2: vehicle speed is equal to or lower than a predetermined vehicle speed VSP1 (VSP≤VSP1)
b3: accelerator pedal is completely released (accelerator pedal opening APO=0)
b4: brake pedal is depressed (brake fluid pressure is equal to or higher than a predetermined value)

Note that the predetermined vehicle speed VSP1 is set a value equal to or below a vehicle speed, at which the lock-up clutch is released in the coast state, and larger than zero.

The controller 12 determines that a coast stop condition holds, permits the coast stop, cancels the fuel injection and stops the engine 1 when all of these conditions b1 to b4 hold.

The controller 12 determines whether or not the above conditions b1 to b4 respectively continue to hold even during the coast stop, and determines that the coast stop condition does not hold and ends the coast stop, i.e. restarts the engine 1 if even one of them no longer holds. Note that the conditions based on which the coast stop is ended are not limited to the above conditions b1 to b4.

The idle stop control and the coast stop control are executed as described above, and the engine 1 is judged to be in the stopped state and the electrical oil pump 10e is driven when either one of the controls is executed. Note that, as is clear from the above conditions, a transition is directly made to the idle stop state if the vehicle stops in the coast stop state. In this case, a transition is made from the coast stop control to the idle stop control with the engine 1 stilled stopped, i.e. with the electrical oil pump 10e still in a driven state.

Here, how to prevent the overheating of the electrical oil pump 10e is described.

The electrical oil pump 10e is composed of the oil pump main body, the electric motor for driving and rotating the oil pump main body and the motor driver as described above. Since the motor driver generates heat when the electrical oil pump 10e is switched from the OFF state to the ON state, damage and reduced lives of components caused by the overheating of the motor driver need to be prevented. Thus, the electrical oil pump 10e is so controlled that the restart thereof is prohibited for a predetermined time after the actuation, and prohibited from being turned on again before the predetermined time elapses.

Accordingly, the restart of the electrical oil pump 10e is prohibited and, as a result, the engine 1 cannot be stopped since the above predetermined time has not yet elapsed when the conditions of the idle stop control and the coast stop control temporarily no longer hold and, immediately thereafter, hold again.

For example, when a driver completely releases the brake pedal in the idle stop state and, thereby, the idle stop condition no longer holds and the engine 1 restarts, the electrical oil pump 10e cannot be driven until a start prohibition timer (EOP start prohibition timer) of the electrical oil pump 10e finishes even if the brake pedal is depressed immediately thereafter and the idle stop condition holds again. During this time, the engine 1 cannot be stopped. Thus, the fuel consumption amount increases by as much as a delay in the stop of the engine 1, thereby deteriorating fuel economy.

Figure 3:
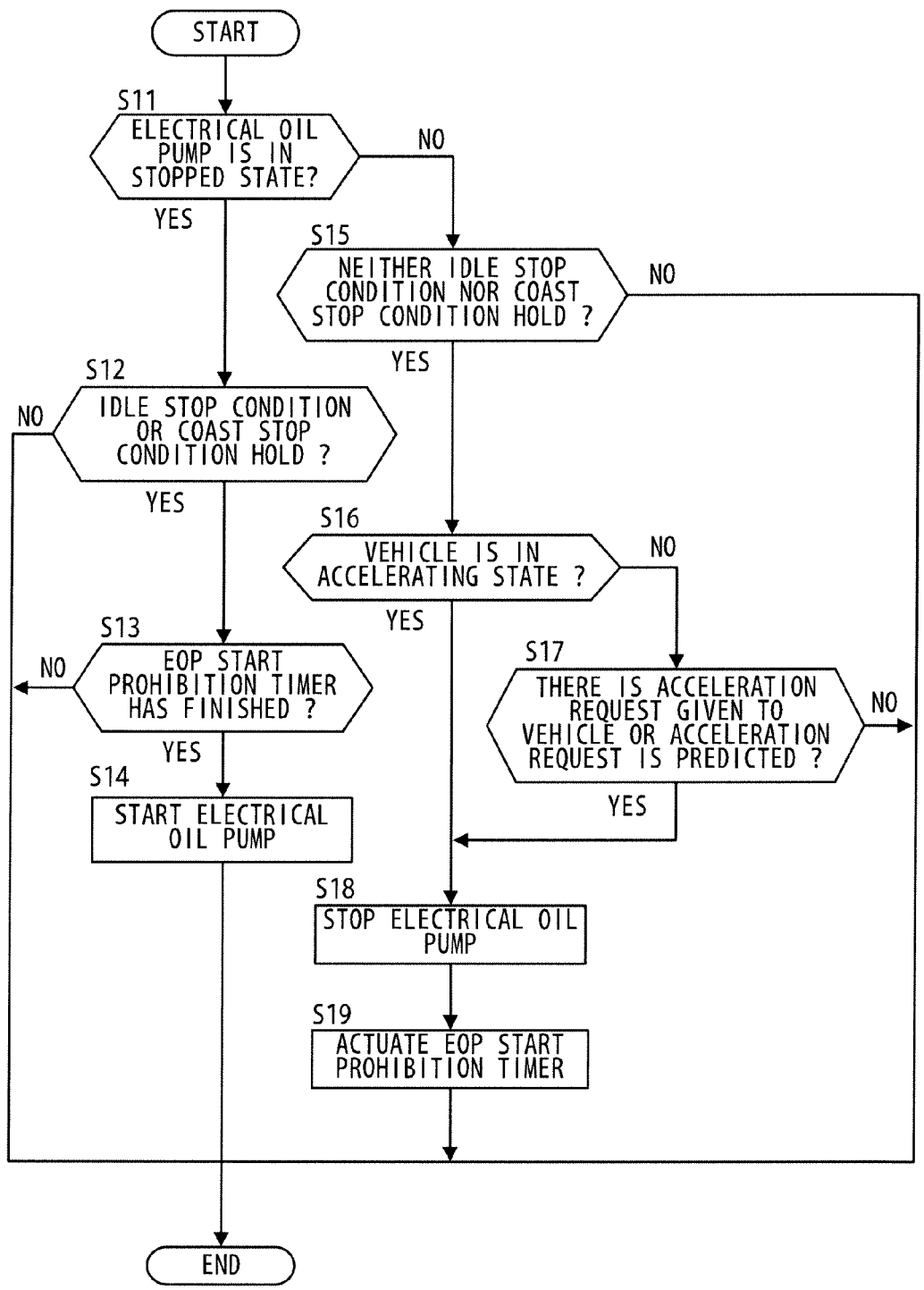
FIG. 3 is a flow chart showing the content of a control of an electrical oil pump executed by a controller in the first embodiment.

Accordingly, in this embodiment, the electrical oil pump 10e is controlled as follows. FIG. 3 is a flow chart showing the content of the control of the electrical oil pump 10e executed by the controller 12. Note that this flow chart is repeatedly performed at every interval of a specified time (e.g. every 10 msec).

In Step S11, the controller 12 determines whether or not the electrical oil pump 10e is in the stopped state. The process proceeds to Step S12 when the electrical oil pump 10e is in the stopped state while proceeding to Step S15 when the electrical oil pump 10e is in the operating state.

In Step S12, the controller 12 determines whether or not the idle stop condition or the coast stop condition holds. The process proceeds to Step S13 when the idle stop condition or the coast stop condition holds while ending when neither of the conditions holds. Here, the idle stop condition and the coast stop condition consist of the conditions a1 to a6 and b1 to b4 based on which the execution of the above idle stop control and coast stop control is determined.

In Step S13, the controller 12 determines whether or not the EOP start prohibition timer has finished. The process proceeds to Step S14 when it is determined that the EOP start prohibition timer has finished while ending when this timer is greater than zero. The EOP start prohibition timer is a timer provided to count a period during which the restart of the electrical oil pump 10e is prohibited, and is so set that the value thereof gradually decreases from a predetermined value to zero when the electrical oil pump 10e is stopped after being started. When the EOP start prohibition timer has not finished yet, the process ends since the electrical oil pump 10e cannot be started even if the idle stop condition or the coast stop condition holds.

In Step S14, the controller 12 starts the electrical oil pump 10e. That is, the controller 12 stops the engine 1 and starts the electrical oil pump 10e when the idle stop condition or the coast stop condition holds and the restart prohibition period has elapsed after the last stop of the electrical oil pump 10e.

On the other hand, when it is determined in Step S11 that the electrical oil pump 10e is in the operating state, the controller 12 determines in Step S15 whether or not neither the idle stop condition nor the coast stop condition holds. The process proceeds to Step S16 when neither of the conditions holds while ending when either of the conditions holds. The idle stop condition and the coast stop condition are the same as those in Step S12 described above. Note that the engine 1 is restarted regardless of the driven state of the electrical oil pump 10e when neither the idle stop condition nor the coast stop condition holds.

In Step S16, the controller 12 determines whether or not the vehicle is in an accelerating state. The process proceeds to Step S18 when the vehicle is determined to be in the accelerating state while proceeding to Step S17 when the vehicle is determined not to be in the accelerating state. That the vehicle is in the accelerating state is determined when one or more of the following conditions c1 to c4 are satisfied.

c1: acceleration of the vehicle has changed from a negative value (decelerating state) to a positive value (accelerating state)
c2: accelerating state has continued for a predetermined time T1 or longer
c3: vehicle speed is higher than the vehicle speed when it was determined that neither the idle stop condition nor the coast stop condition held
c4: state where the vehicle speed is higher than the vehicle speed when it was determined that neither the idle stop condition nor the coast stop condition held has continued for a predetermined time T2 or longer Note that the predetermined time T1 in the condition c2 is set at a time sufficient to allow an accurate determination that the vehicle is in the accelerating state. The vehicle speed when it was determined that neither condition held in the conditions c3 and c4 is the vehicle speed when it was determined that neither the idle stop condition nor the coast stop condition held in Step S15 described above. The predetermined time T2 in the condition c4 is set at a time sufficient to allow an accurate determination that the vehicle speed is higher than the one when it was determined that neither the idle stop condition nor the coast stop condition held.

In Step S17, the controller 12 determines whether or not there is an acceleration request given to the vehicle or an acceleration request is predicted. The process proceeds to Step S18 when there is the acceleration request given to the vehicle or the acceleration request is predicted while ending when it is determined that no acceleration request is given and no acceleration request is predicted. That there is an acceleration request given to the vehicle or an acceleration request is predicted is determined when one or more of the following conditions are satisfied.

d1: accelerator pedal is depressed (accelerator pedal opening $APO \neq 0$)
d2: depressed state of the accelerator pedal has continued for a predetermined time T3 or longer
d3: depressed amount of the accelerator pedal is equal to or more than an acceleration determining depressed amount
d4: state where the depressed amount of the accelerator pedal is equal to or more than the acceleration determining depressed amount has continued for a predetermined time T4 or longer
d5: depressing speed of the accelerator pedal is equal to or higher than an acceleration determining depressing speed (opening/sec)
d6: releasing speed of the brake pedal is equal to or higher than an acceleration determining releasing speed (opening/sec) (reducing speed of the brake fluid pressure is equal to or higher than the acceleration determining releasing speed)
d7: depression switching time from the complete release of the brake pedal to the depression of the accelerator pedal is equal to or shorter than an acceleration determining depression switching time
d8: range or mode is switched (e.g. judgment is made based on a switch to an S-range or L-range in which a shift is made only in one or more gear positions at a low-speed side, a switch to an M-mode in which a manual shift is possible, a shift by a paddle switch, turn-on of a power mode switch to shift an entire shift map toward the low-speed side, a shift to an R-range which is a reverse range, and the like).
d9: acceleration of the vehicle in forward and backward directions, that in a lateral direction or a resultant acceleration is equal to or higher than a predetermined acceleration The conditions d1 to d5 are for determining whether or not there is an acceleration request and the conditions d6 to d9 are for determining whether or not an acceleration request is predicted. Accordingly, in this Step, whether or not there is a driver's intention to accelerate is determined by determining whether or not one or more of the conditions d1 to d9 are satisfied.

Note that the predetermined time T3 in the condition d2 is set at a time sufficient to allow an accurate determination that the accelerator pedal is depressed. The acceleration determining depressed amount in the condition d3 is set at an opening sufficient to allow an accurate determination that the driver has depressed the accelerator pedal with an intention to accelerate. The predetermined time T4 in the condition d4 is set at a time sufficient to allow an accurate determination that the driver has depressed the accelerator pedal with an intention to accelerate. The acceleration determining depressing speed in the condition d5 is set at a speed sufficient to allow an accurate determination that the driver has depressed the accelerator pedal with an intention to accelerate. The acceleration determining releasing speed in the condition d6 is set at a speed sufficient to allow an accurate determination that the driver has released the brake pedal with an intention to accelerate. The acceleration determining depression switching time in the condition d7 is set at a time sufficient to allow an accurate determination that the driver has switched from the depression of the brake pedal to that of the accelerator pedal with an intention to accelerate.

That is, in Steps S16 and S17, the controller 12 determines whether or not there is a possibility that the idle stop condition or the coast stop condition holds and the idle stop control or the coast stop control is restarted immediately after the idle stop control or the coast stop control stops.

In Step S18, the controller 12 stops the electrical oil pump 10e. That is, when it is determined that the vehicle is in the accelerating state or there is the driver's intention to accelerate in Step S16 or S17, the controller 12 stops the electrical oil pump 10e, judging a low possibility of restarting the idle stop control and the coast stop control immediately thereafter. Since the engine 1 is already started in this case, a necessary hydraulic pressure is ensured even if the electrical oil pump 10e is stopped.

In Step S19, the controller 12 actuates the EOP start prohibition timer. By this, the restart of the electrical oil pump 10e is prohibited until the EOP start prohibition timer finishes, i.e. until this timer becomes zero.

The above process is summarized as follows. Even if the idle stop condition and the coast stop condition no longer hold when the idle stop control or the coast stop control is executed and the electrical oil pump 10e is operating, the actuation of the electrical oil pump 10e is continued until it is determined that the vehicle is in the accelerating state or there is the driver's intention to accelerate.

Figure 4:
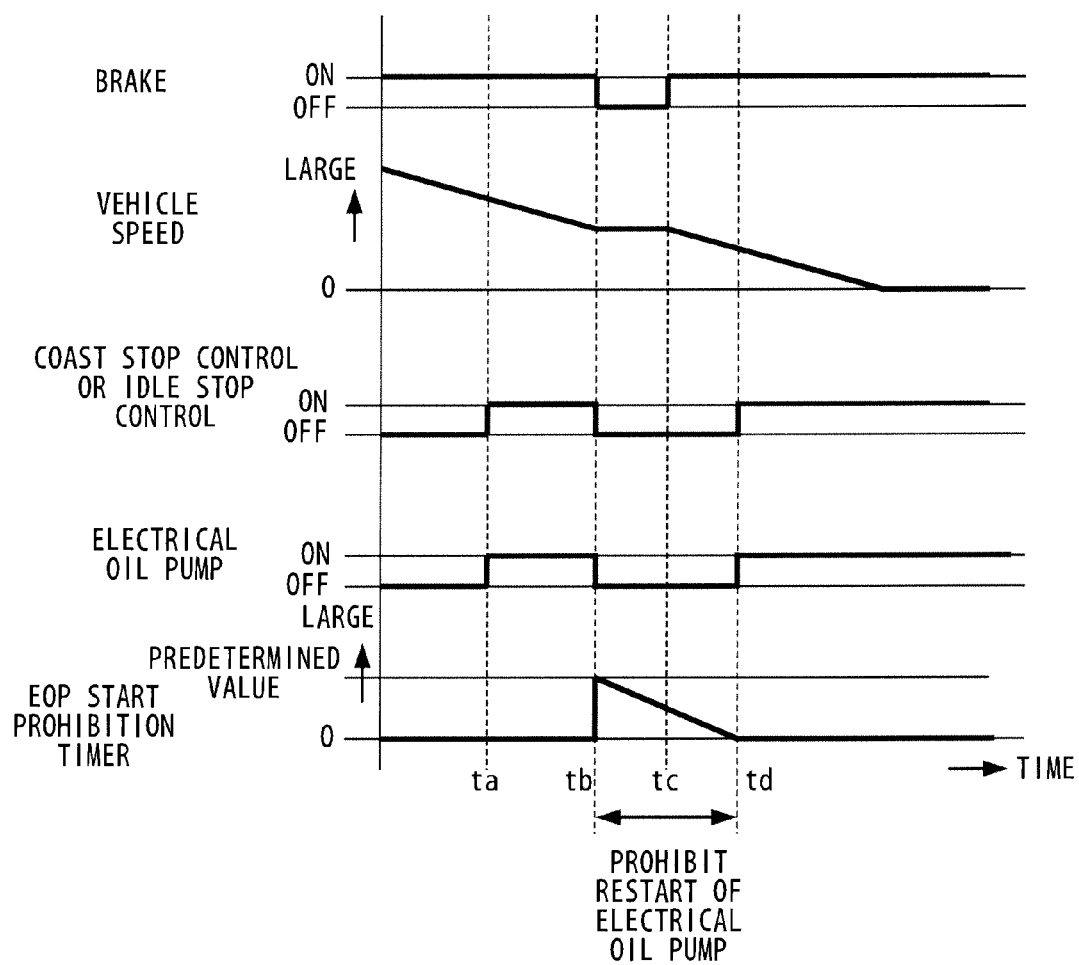
FIG. 4 is a time chart showing a control of an electrical oil pump in a comparative example.

Next, functions of this embodiment are described with reference to FIGS. 4 to 6. FIG. 4 is a time chart showing an operating state of an electrical oil pump in a comparative example.

While the vehicle is running in a coast state where the vehicle speed is reduced by the driver depressing the brake pedal, the coast stop condition holds and the electrical oil pump 10e starts at time ta.

Thereafter, at time tb, the driver completely releases the brake pedal and the coast stop condition no longer holds, whereby the engine 1 is started and the electrical oil pump 10e is stopped. By this, the EOP start prohibition timer is actuated and the restart of the electrical oil pump 10e is prohibited until the EOP start prohibition timer finishes.

Thereafter, at time tc, the driver depresses the brake pedal again and the coast stop condition holds again. However, since the EOP start prohibition timer has not finished yet, the restart of the electrical oil pump 10e is prohibited and, hence, the coast stop control cannot be executed.

At time td, the EOP start prohibition timer finishes and, at this time point, the electrical oil pump 10e can be restarted. Thus, the electrical oil pump 10e is started and the coast stop control is executed.

That is, the start of the coast stop control is delayed from time tc to time td and the stop of the engine 1 is delayed by that much. Therefore, a fuel consumption amount increases to deteriorate fuel economy.

Figure 5:
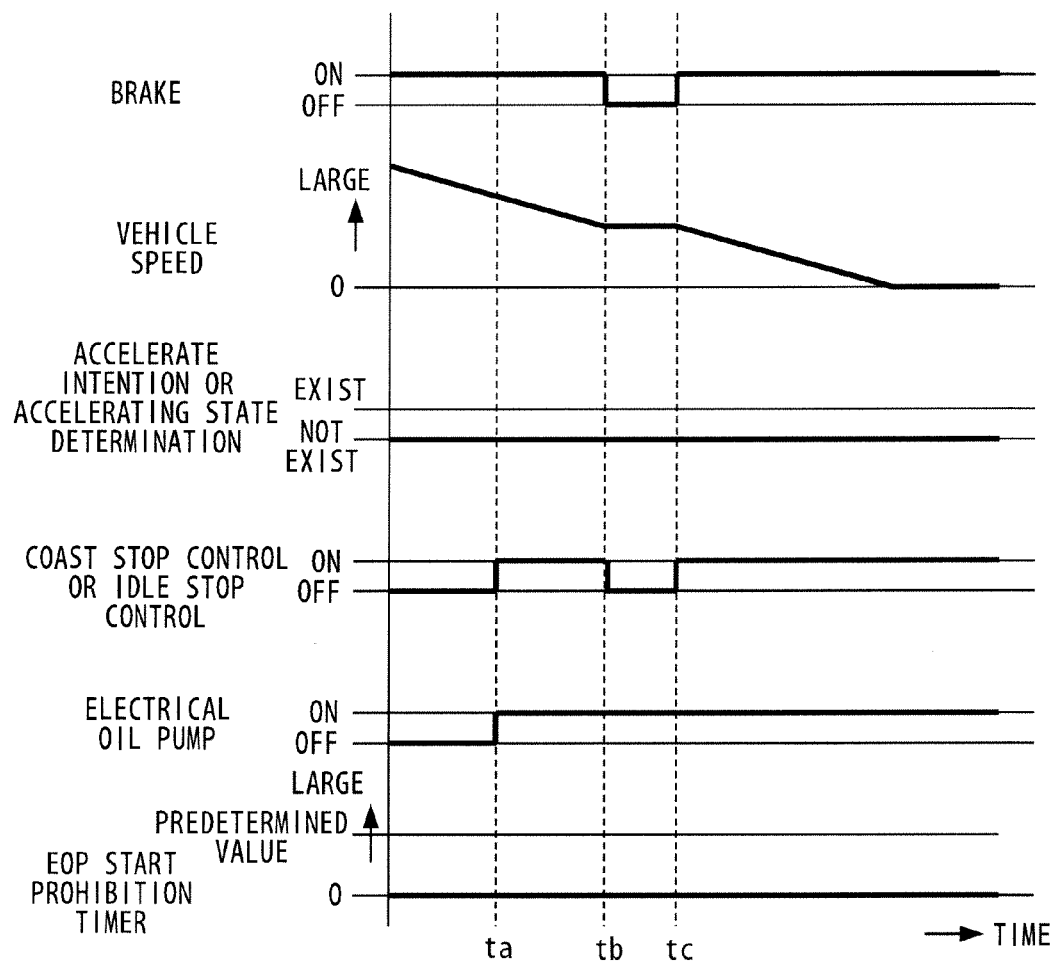
FIG. 5 is a time chart showing functions and effects of the first embodiment.
Figure 6:
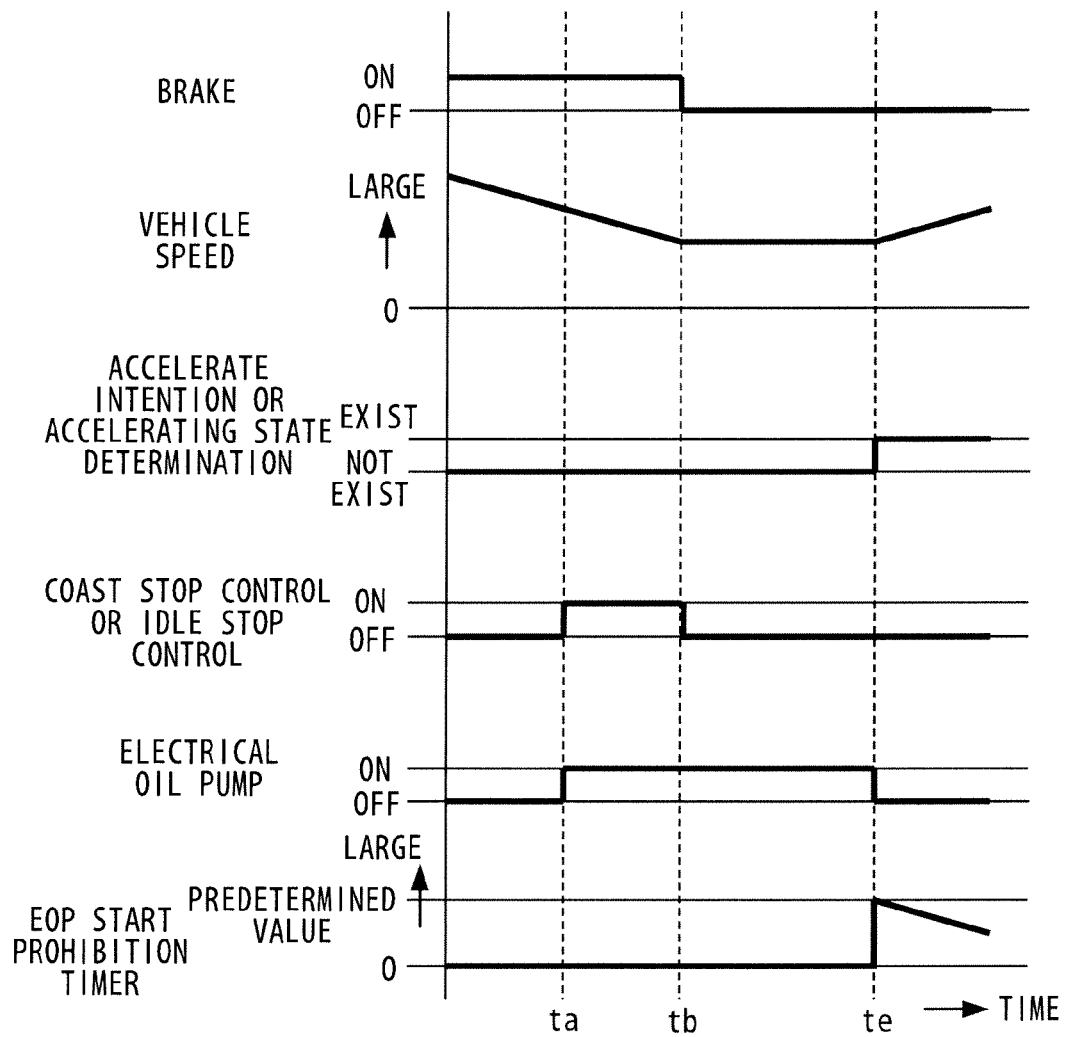
FIG. 6 is a time chart showing functions and effects of the first embodiment.

FIGS. 5 and 6 are time charts showing functions of the engine auto-stop vehicle in this embodiment.

As shown in FIG. 5, this time chart is the same as the comparative example up to time tb. However, in this embodiment, the actuation of the electrical oil pump 10e is continued even after the coast stop condition no longer holds at time tb. By this, when the coast stop condition holds again at time tc, the electrical oil pump 10e is already started and the coast stop control can be executed independently of the EOP start prohibition timer.

Further, if it is determined at time to that the vehicle is in the accelerating state or there is the driver's intention to accelerate in a state where the electrical oil pump 10e continues to be actuated after the coast stop condition no longer holds at time tb as shown in FIG. 6, the actuation of the electrical oil pump 10e is stopped. Thereafter, the EOP start prohibition timer is actuated.

That is, this embodiment provides for a case where the actuation of the electrical oil pump 10e is continued until it is determined that the vehicle is in the accelerating state or there is the driver's intention to accelerate even after the coast stop condition and the idle stop condition no longer hold and, immediately thereafter, the coast stop condition and the idle stop condition hold again.

As described above, in this embodiment, if the idle stop condition and the coast stop condition no longer hold when the electrical oil pump 10e is started because the idle stop condition or the coast stop condition holds, the actuation of the electrical oil pump 10e is continued until it is, thereafter, determined that the vehicle is in the accelerating state or there is the driver's intention to accelerate. By this, stopping of the electrical oil pump 10e and actuating of the EOP start prohibition timer can be avoided in such a situation where the idle stop control or the coast stop control is temporarily interrupted, and the engine 1 can be quickly automatically stopped when the idle stop condition or the coast stop condition holds again. Therefore, a fuel economy improvement effect by the automatic stop of the engine 1 can be promoted.

Further, the controller 12 determines that the vehicle is in the accelerating state when the acceleration of the vehicle has changed from a negative value (decelerating state) to a positive value (accelerating state) (condition c1), when the accelerating state has continued for the predetermined time T1 or longer (condition c2), when the vehicle speed is higher than the vehicle speed when it was determined that the idle stop condition and the coast stop condition no longer held (condition c3) or when the state where the vehicle speed is higher than the vehicle speed when it was determined that the idle stop condition and the coast stop condition no longer held has continued for the predetermined time T2 or longer (condition 4). Thus, the accelerating state of the vehicle can be easily and accurately determined.

Further, the controller 12 determines the driver's intention to accelerate when the accelerator pedal is depressed (condition d1), when the depressed state of the accelerator pedal has continued for the predetermined time T3 or longer (condition d2), when the depressed amount of the accelerator pedal is equal to or more than the acceleration determining depressed amount (condition d3), when the state where the depressed amount of the accelerator pedal is equal to or more than the acceleration determining depressed amount has continued for the predetermined time T4 or longer (condition d4), when the depressing speed of the accelerator pedal is equal to or higher than the acceleration determining depressing speed (opening/ sec) (condition d5), when the releasing speed of the brake pedal is equal to or higher than the acceleration determining releasing speed (opening/sec) (condition d6) or when the depression switching time from the complete release of the brake pedal to the depression of the accelerator pedal is equal to or shorter than the acceleration determining depression switching time (condition d7). Thus, the driver's intention to accelerate can be easily and accurately determined.

(Second Embodiment)

In a second embodiment, a control described below is executed since an upper limit value is set for the drive duration of the electrical oil pump 10e. Note that the overall construction of a vehicle is similar to that of the first embodiment.

Figure 7:
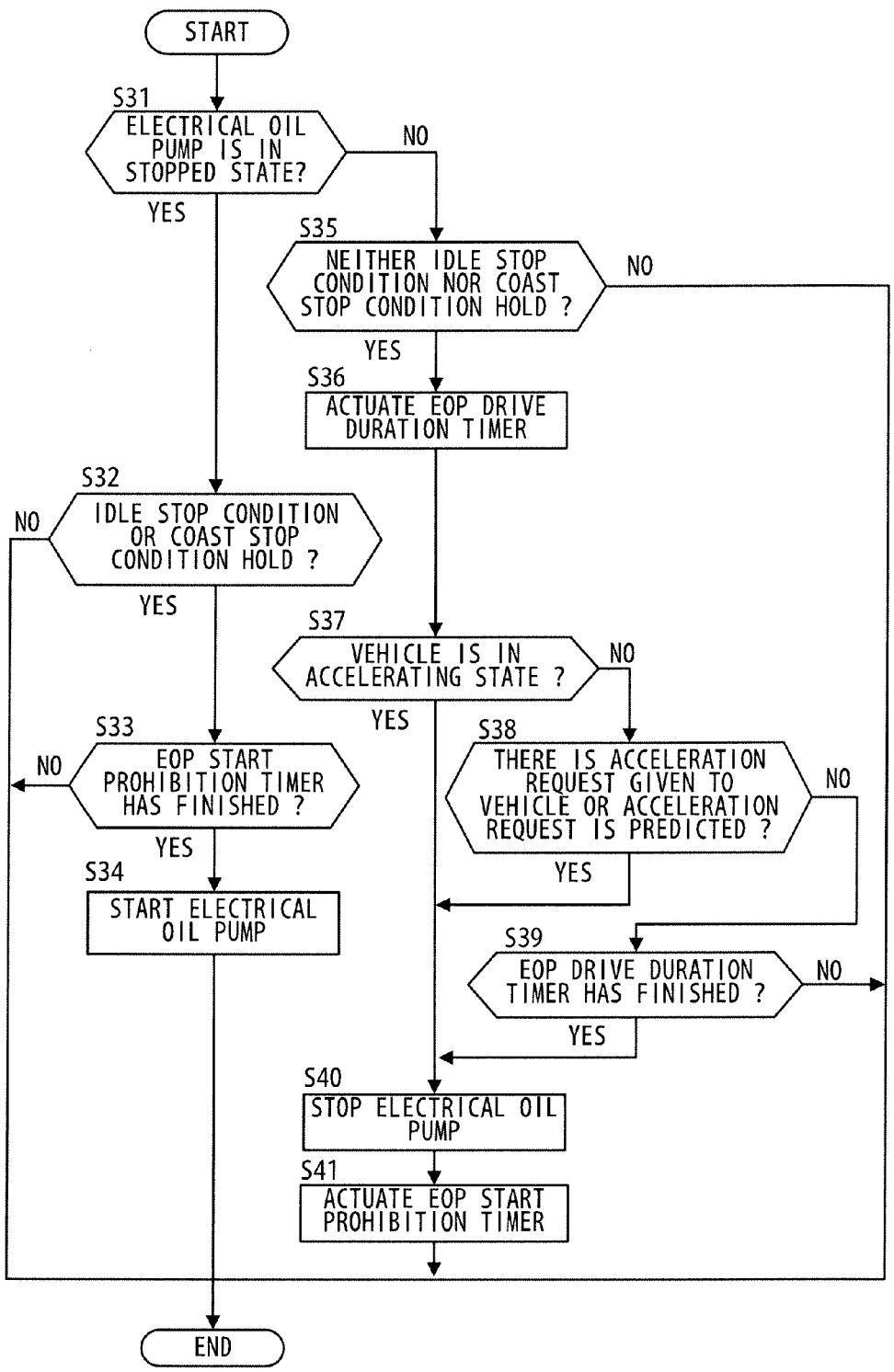
FIG. 7 is a flow chart showing the content of a control of an electrical oil pump executed by a controller in a second embodiment.

FIG. 7 is a flow chart showing the content of the control of the electrical oil pump 10e executed by the controller 12. Note that this flow chart is repeatedly performed at every interval of a specified time (e.g. every 10 msec).

Steps S31 to S35 are the same as Steps S11 to S15 of the first embodiment

In Step S36, the controller 12 actuates an electrical oil pump drive duration timer (EOP drive duration timer). The EOP drive duration timer is a timer set to avoid a long continuous operating time of the electrical oil pump 10e when the actuation of the electrical oil pump 10e is continued after the idle stop condition and the coast stop condition no longer hold. Since the motor driver generates heat due to the continuous actuation of the electrical oil pump 10e, there is an upper limit to the continuous operating time to prevent overheating. Accordingly, the EOP drive duration timer is set at a predetermined timer value that enables the overheating of the motor driver to be prevented while the electrical oil pump 10e is continuously operated in view of the operating time of the electrical oil pump 10e at the time of the coast stop control and the idle stop control.

In this way, the drive duration upper limit time is set as the timer value in the EOP drive duration timer at the time of the first processing (when a determination result in Step S31 changes from YES to NO) after the start of the electrical oil pump 10e, and the timer value is counted during the succeeding processings.

Steps S37 and S38 are the same as Steps S16 and S17 of the first embodiment.

In Step S39, the controller 12 determines whether or not the EOP drive duration timer has finished. The process proceeds to Step S40 when the EOP drive duration timer has finished while ending unless otherwise.

Steps S40 and S41 are the same as Steps S18 and S19 of the first embodiment.

The above process is summarized as follows. When it is not determined that the vehicle is in the accelerating state and there is the driver's intention to accelerate even if the actuation of the electrical oil pump 10e is continued for the drive duration upper limit time after the idle stop condition and the coast stop condition no longer hold, the actuation of the electrical oil pump 10e is stopped.

Figure 8:
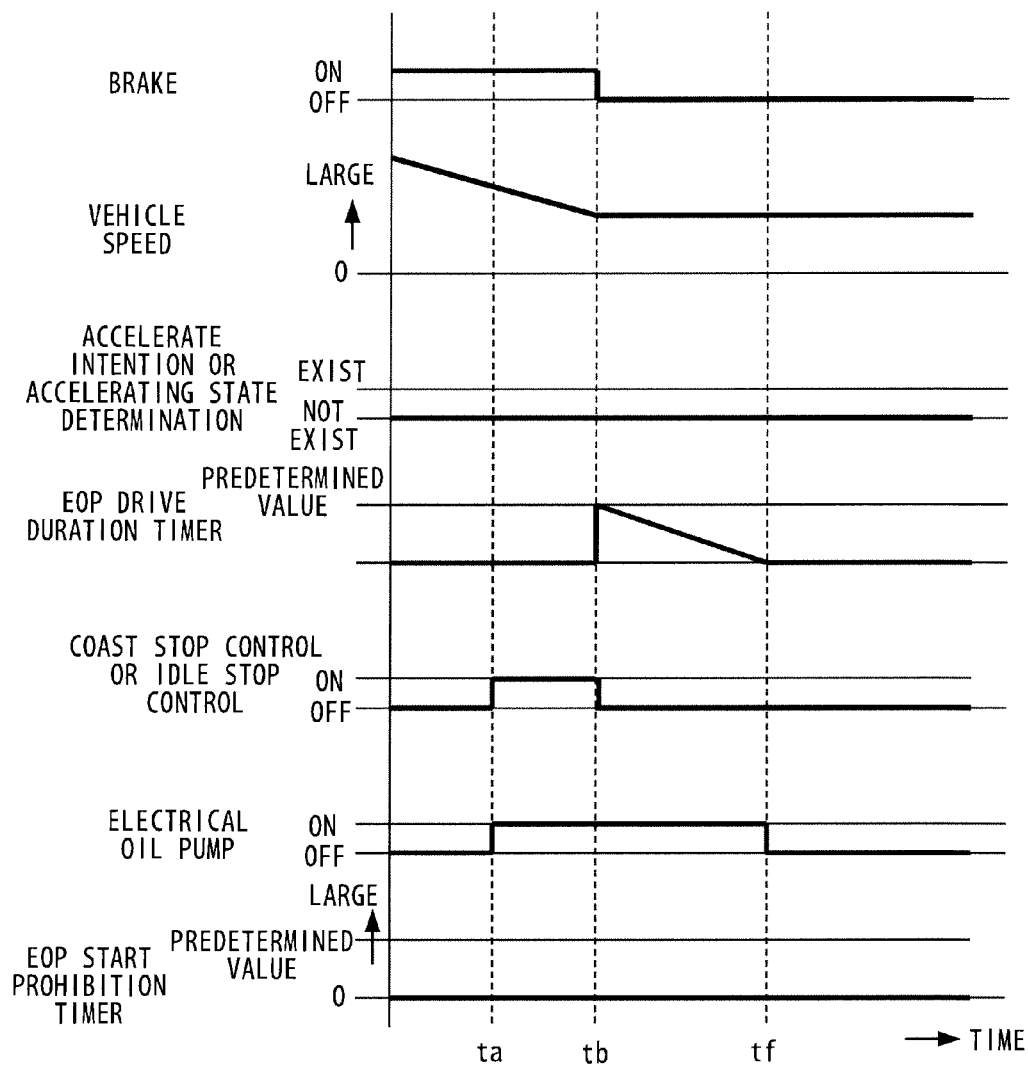
FIG. 8 is a time chart showing functions and effects of the second embodiment.

Next, functions of this embodiment are described with reference to FIG. 8. FIG. 8 is a time chart showing functions of the engine auto-stop vehicle in this embodiment.

The process is similar to that of the first embodiment up to time tb as shown in FIG. 8. However, in this embodiment, the EOP drive duration timer is actuated when the coast stop condition no longer holds at time tb. After being increased in a stepwise manner up to the drive duration upper limit value at time tb, the EOP drive duration timer is gradually reduced with time.

Thereafter, the vehicle speed is substantially constant and neither the accelerating state of the vehicle nor the driver's intention to accelerate is detected for a period up to time tf. For example, in a situation where the vehicle is running downhill and a force in an accelerating direction subjected to the vehicle due to a gradient and a braking force subjected to the vehicle from engine braking and resistance are balanced, the vehicle speed may be held constant in a coast state where neither the accelerator pedal nor the brake pedal is depressed. If the EOP drive duration timer becomes zero at time tf in such a case, the actuation of the electrical oil pump 10e is stopped even when neither the accelerating state of the vehicle nor the driver's intention to accelerate is determined.

As described above, in this embodiment, upon the elapse of the drive duration upper limit time after the coast stop condition and the idle stop condition no longer hold even if the actuation of the electrical oil pump 10e is continued after the conditions no longer hold, the actuation of the electrical oil pump 10e is stopped even when neither the accelerating state of the vehicle nor the driver's intention to accelerate is determined. Thus, continuous operation of the electrical oil pump 10e for a long time can be avoided. This can suppress the shortening of a period, during which the electrical oil pump 10e can be continuously operated at the time of the next operation, due to the overheating of the motor driver caused by the continuous actuation of the electrical oil pump 10e.

The embodiments of the present invention have been described above. The above embodiments are merely illustration of application examples of the present invention and not of the nature to limit the technical scope of the present invention to the specific constructions of the above embodiments. Various changes can be made without departing from the gist of the present invention.

For example, in the above first and second embodiments, the actuation of the electrical oil pump 10e is continued until the accelerating state of the vehicle or the driver's intention to accelerate is determined or until the EOP drive duration timer finishes after the coast stop condition and the idle stop condition no longer hold. However, an instruction current to the electrical oil pump 10e in this case may be set lower than that at the time of normal startup according to the operating state of the engine 1.

Figure 9:
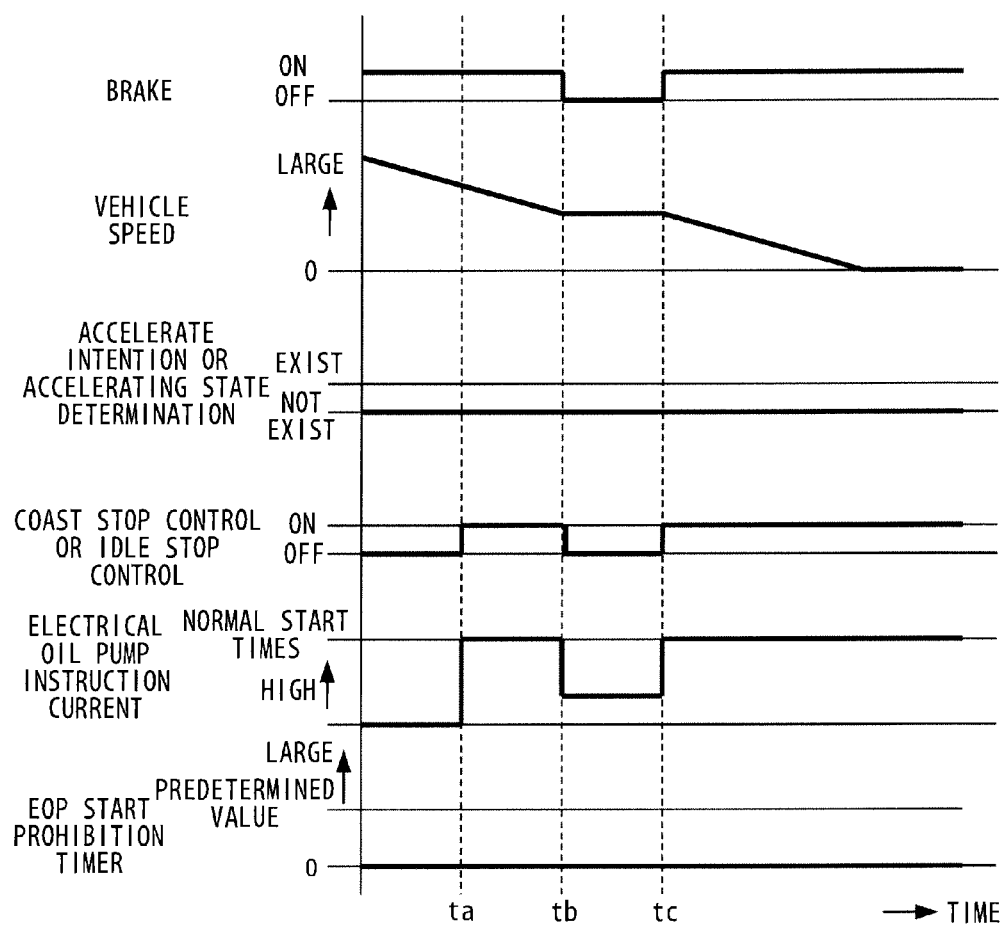
FIG. 9 is a time chart showing functions and effects of another embodiment.

That is, as shown in a time chart of FIG. 9, a necessary hydraulic pressure is ensured by setting the instruction current to the electrical oil pump 10e at a predetermined instruction current during the coast stop control or the idle stop control (time ta to tb), and the instruction current is set at a value lower than the predetermined instruction current (tb to tc) after the coast stop condition and the idle stop condition no longer hold. Since the engine 1 is restarted and the mechanical oil pump 10m is operating during this time, the necessary hydraulic pressure can be sufficiently ensured even if the discharge pressure of the electrical oil pump 10e is reduced. By returning the instruction current to the electrical oil pump 10e to the predetermined instruction current in normal times when the coast stop condition or the idle stop condition holds again, the necessary hydraulic pressure can be ensured (tc and thereafter) even if the engine 1 stops.

Since the instruction current to the electrical oil pump 10e can be suppressed in this way while the mechanical oil pump 10m is operating, fuel economy can be improved by suppressing power consumption of the electrical oil pump 10e and suppressing the fuel consumption amount of the engine 1 necessary to charge the battery 13 anew.

This application claims priority from Japanese Patent Application No. 2010-197722, filed Sep. 3, 2010, which is incorporated herein by reference in its entirety.

What is claimed is:
1. An engine auto-stop vehicle, comprising:
   an engine configured to automatically stop when a stop condition holds and to restart when a restart condition holds;
   a first oil pump which is driven by the engine;

a second oil pump configured to operate during an automatic stop of the engine;

an acceleration determining unit configured to perform at least one acceleration condition determination selected from: whether or not the vehicle is in an accelerating state, whether or not there is an acceleration request and whether or not an acceleration request is predicted; and an oil pump control unit configured to actuate the second oil pump when the stop condition holds and to cause an actuation of the second oil pump to continue during a period until the at least one acceleration condition determination is performed by the acceleration determining unit after the restart condition holds.

2. The engine auto-stop vehicle according to claim 1, wherein:

the oil pump control unit is configured to stop the actuation of the second oil pump upon an elapse of a drive duration upper limit time after the restart condition holds even if no acceleration condition determination is reached.

3. The engine auto-stop vehicle according to claim 1, wherein:

the oil pump control unit is configured to cause the actuation of the second oil pump to continue with a lower output after the restart condition holds than before the restart condition holds.

4. The engine auto-stop vehicle according to claim 1, wherein:

the acceleration determining unit is configured to determine whether or not the vehicle is in the accelerating state based on at least one of the following: a change of an acceleration of the vehicle from a negative value to a positive value, a continuation of a state where the acceleration is a positive value, a vehicle speed being higher than a vehicle speed when the restart condition held, and a continuation of a state where the vehicle speed is higher than the vehicle speed when the restart condition held.

5. The engine auto-stop vehicle according to claim 1, wherein:

the acceleration determining unit is configured to determine whether or not there is the acceleration request based on at least one of the following: an increase of a depressed amount of an accelerator pedal to exceed zero, a continuation of a state where the depressed amount of the accelerator pedal is more than zero, an increase of the depressed amount of the accelerator pedal to be at least an acceleration determining depressed amount, a continuation of a state where the depressed amount of the accelerator pedal is equal to at least an accelerator determining depressed amount, and an increase of a depressing speed of the accelerator pedal to at least an acceleration determining depressing speed.

6. The engine auto-stop vehicle according to claim 1, wherein:

the acceleration determining unit is configured to determine whether or not the acceleration request is predicted based on at least one of an increase of a releasing speed of a brake pedal to at least an acceleration determining releasing speed, and a time required until a depressed amount of the accelerator pedal exceeds zero after a depressed amount of the brake pedal becomes zero, which time is equal to or shorter than an acceleration determining depression switching time.

7. A control method for an engine auto-stop vehicle including an engine configured to automatically stop when a stop condition holds and to restart when a restart condition holds, a first oil pump which is driven by the engine and a second oil pump configured to operate during an automatic stop of the engine, comprising:

a determining step of performing at least one acceleration condition determination selected from: whether or not the vehicle is in an accelerating state, whether or not there is an acceleration request, and whether or not an acceleration request is predicted: and a continuing step of actuating the second oil pump when the stop condition holds and causing an actuation of the second oil pump to continue during a period until the at least one acceleration condition determination is performed in the determining step after the restart condition holds.

8. The control method according to claim 7, wherein:

the actuation of the second oil pump stops upon an elapse of a drive duration upper limit time after the restart condition holds even if no acceleration condition determination is reached.

9. The control method according to claim 7, wherein:

the actuation of the second oil pump continues with a lower output after the restart condition holds than before the restart condition holds.

10. The control method according to claim 7, wherein:

determination whether or not the vehicle is in the accelerating state is performed based on at least one of the following: a change of an acceleration of the vehicle from a negative value to a positive value, a continuation of a state where the acceleration is a positive value, a vehicle speed being higher than a vehicle speed when the restart condition held, and a continuation of a state where the vehicle speed is higher than the vehicle speed when the restart condition held.

11. The control method according to claim 7, wherein:

determination whether or not there is the acceleration request is performed based on at least one of the following: an increase of a depressed amount of an accelerator pedal to exceed zero, a continuation of a state where the depressed amount of the accelerator pedal is more than zero, an increase of the depressed amount of the accelerator pedal to at least an acceleration determining depressed amount, a continuation of a state where the depressed amount of the accelerator pedal is equal to at least an accelerator determining depressed amount, and an increase of a depressing speed of the accelerator pedal to at least an acceleration determining, depressing speed.

12. The control method according to claim 7, wherein:

determination whether or not the acceleration request is predicted is performed based on at least one of an increase of a releasing speed of a brake pedal to at least an acceleration determining releasing speed, and a time required until a depressed amount of the accelerator pedal exceeds zero after a depressed amount of the brake pedal becomes zero, which time is equal to or shorter than an acceleration determining depression switching time.

13. An engine auto-stop vehicle, comprising:

an engine configured to automatically stop when a stop condition holds and to restart when a restart condition holds;

a first oil pump which is driven by the engine;

a second oil pump configured to operate during an automatic stop of the engine;

acceleration determining means for performing at least one acceleration condition determination selected from: whether or not the vehicle is in an accelerating state, whether or not there is an acceleration request, and whether or not an acceleration request is predicted; and oil pump control means for actuating the second oil pump when the stop condition holds and causing an actuation of the second oil pump to continue during a period until the at least one acceleration condition determination is performed by the acceleration determining means after the restart condition holds.

14. The engine auto-stop vehicle according to claim 13, wherein:

the oil pump control means stops the actuation of the second oil pump upon an elapse of a drive duration upper limit time after the restart condition holds even if no acceleration condition determination is reached.

15. The engine auto-stop vehicle according to claim 13, wherein:

the oil pump control means causes the actuation of the second oil pump to continue with a lower output after the restart condition holds than before the restart condition holds.

16. The engine auto-stop vehicle according to claim 13, wherein:

the acceleration determining means determines whether or not the vehicle is in the accelerating state based on at least one of the following: a change of an acceleration of the vehicle from a negative value to a positive value, a continuation of a state where the acceleration is a positive value, a vehicle speed being higher than a vehicle speed when the restart condition held, and a continuation of a state where the vehicle speed is higher than the vehicle speed when the restart condition held.

17. The engine auto-stop vehicle according to claim 13, wherein:

the acceleration determining means determines whether or not there is the acceleration request based on at least one of the following: an increase of a depressed amount of an accelerator pedal to exceed zero, a continuation of a state where the depressed amount of the accelerator pedal is more than zero, an increase of the depressed amount of the accelerator pedal to at least an acceleration determining depressed amount, a continuation of a state where the depressed amount of the accelerator pedal is equal to at least an accelerator determining depressed amount and an increase of a depressing speed of the accelerator pedal to at least an acceleration determining depressing speed.

18. The engine auto-stop vehicle according to claim 13, wherein:

the acceleration determining means determines whether or not the acceleration request is predicted based on at least one of an increase of a releasing speed of a brake pedal to at least an acceleration determining releasing speed, and a time required until a depressed amount of the accelerator pedal exceeds zero after a depressed amount of the brake pedal becomes zero, which time is equal to or shorter than an acceleration determining depression switching time.

\* \* \* \* \*